No. 699,437. Patented May 6, 1902.
S. BACKUS.
MATCH MACHINE.
(Application filed Apr. 7, 1898. Renewed Mar. 9, 1899.)
(No Model.) 6 Sheets—Sheet 1.

Witnesses:
Inventor:
his Attorney

No. 699,437. Patented May 6, 1902.
S. BACKUS.
MATCH MACHINE.
(Application filed Apr. 7, 1898. Renewed Mar. 9, 1899.)

(No Model.) 6 Sheets—Sheet 6.

Witnesses:
D. E. McQuaid
L. H. Edwards

Inventor:
Senate Backus
by O. M. Clarke
his Attorney

UNITED STATES PATENT OFFICE.

SENATE BACKUS, OF PITTSBURG, PENNSYLVANIA.

MATCH-MACHINE.

SPECIFICATION forming part of Letters Patent No. 699,437, dated May 6, 1902.

Application filed April 7, 1898. Renewed March 9, 1899. Serial No. 708,462. (No model.)

*To all whom it may concern:*

Be it known that I, SENATE BACKUS, a citizen of the United States, residing at Pittsburg, in the county of Allegheny and State of Pennsylvania, have invented or discovered a new and useful Improvement in Match-Machines, of which the following is a full, clear, and exact description, reference being had to the accompanying drawings, forming part of this specification, in which—

My invention relates to the manufacture of matches and to the mechanism by which the various operations are performed.

It relates to means for cutting the blanks from previously-prepared strips of veneer-wood, individually manipulating such blanks and depositing them between carrying-belts, passing them over a heading-roller, conveying them around a drying-cylinder, and finally discharging them in a finished condition ready for use, as shall be more fully hereinafter set forth.

Primarily the blank strips of veneer are prepared by dipping one edge in paraffin, thereby facilitating the ignition of the match, and by reason of the manufacture of matches from such strips of veneer, as hereinafter described, the operation of treating the blank is rendered extremely easy and cheap.

Figures 20, 21:
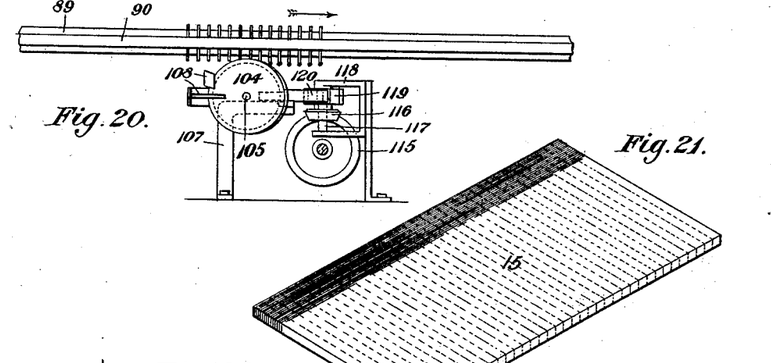
Fig. 20 is a side elevation of the composition-wheel.
Fig. 21 is a perspective view of a blank, showing one edge prepared by soaking in paraffin, the grain of the wood being across the blank.
Figure 22:
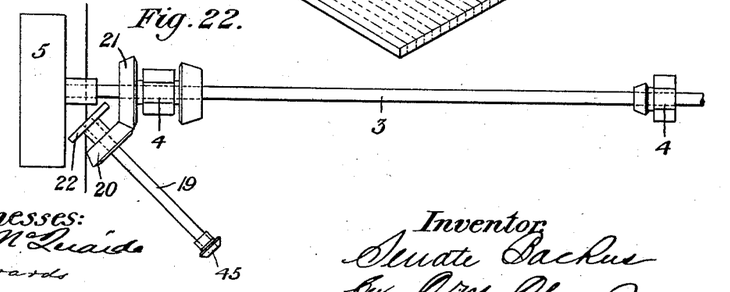
Fig. 22 is
50 a plan view of the forward end of the main shaft and accompanying gearing.

The application of the paraffin, which is done while in a melted condition, is indicated in Fig. 21.

Referring now to the drawings, 2 is the base of the machine, upon which is mounted the various operative parts, being supported by suitable legs. A main shaft 3, mounted in bearings 4, extends longitudinally of the machine and is supplied at the front end with a pulley 5, by which power is applied, the shaft 3 transmitting motion to the various operative parts of the machine.

In Fig. 21 I have shown in perspective a section of veneer-wood from which the blanks are cut, the grain of the wood extending across the blank and the blanks being indicated in dotted lines. These blanks are introduced upon the table 6 to upper and lower feed-rollers 7 8, mounted in housings 9, which are provided with temper-screws 10, bearing upon springs 11 and transmitting a downward pressure to the upper roll 7, by which the pressure of the feed may be regulated.

Lateral guides 12 are mounted on each side of the table, between which the blank is fed to the rollers, and across such guides immediately in front of the rollers is a double bar 13, between the upper and lower sides of which is tightly embraced the spring-wires 14 14, adapted to bear downwardly upon the blank 15 in advance of the rollers, which are grooved at 16 to permit of their passage. In advance of the rollers is also mounted a double bar 13', between the upper and lower sides of which is embraced the reflexed flat springs 17 18, the center one of which extends up between the wire springs 14 and forwardly to a point immediately back of the shear-blade. In this manner the blank is held down flat upon the table in its forward progress from the rollers to the shear-blade.

It will be noted that the position of the table 6 is at an angle to the center of the machine, and it is so located in order that the blank after shearing may be as near as possible to the wheel, by which it is delivered to the carrying-belts.

The feed-rollers and the other parts of mechanism upon the feed-table are operated, primarily, through an angle-shaft 19, provided with a bevel-wheel 20, in mesh with a driving bevel-wheel 21 upon the main shaft 3. At the inner end the shaft is provided with a crank-disk 22, from which extends a pitman 23, pivotally connected to a vertically-reciprocating bar 24, mounted in a guide-bracket 25 and in the base 26. Upon this base, which is incorporated with the frame of the machine, is mounted a framework 27, to an extension 27' of which is pivoted at 28 a bell-crank lever 29, to the upper arm of which is attached by link 30 the upper end of reciprocating bar 24. The lower arm of the lever is similarly connected by link 31 to the end of a reciprocating knife-bar 32, slidingly mounted in the framework 27 and provided with a cutting-blade 33. As the blank is fed forward by the rolls it proceeds until stopped by a limiting edge or bank 34, the rolls slipping in the meantime, and at this point in its progress a treadle 35 is brought downwardly to bear upon the top of the blank and hold it during the shearing operation. This treadle forms the terminal of an arm 36, pivoted at 37 to a depending bracket 38, the arm 36 having an extension 39, projecting under a depressing-spring 40, mounted in a guide 41 and having at the top a temper-screw 42. Extending across the framework 27 is a shaft 43, in communication through bevel-wheels 44 45 and vertical shaft 46 with the shaft 19, by which means the shaft 43 is operated. Mounted thereon is a cam 46', which in its rotation will raise the extension 39 of arm 36 and lift the treadle 35 from the blank when it is to be removed, the spring 40 throwing the treadle down when the cam is revolved.

Rotation of the feed-rollers is accomplished through a reciprocating pawl 47, actuated by an eccentric 48 on shaft 43 in engagement with a ratchet-wheel 49, mounted on the shaft of the lower roller 8, the rollers being geared together by toothed pinions 50 at the other end.

It will be seen that clearance-space 51 for the knife is provided, also an outer clearance-space 52, with an intervening partition 53, upon which the blank rests, the edge 34 projecting up slightly to act as a stop, as has been said.

Immediately adjacent to the inner end of the platform is the blank-carrying or spindle wheel 54, mounted on shaft 55, having a support in suitable bearing 56 over the shaft 3 and at the top in bearing 57, supported in arms 58, rigidly mounted upon the base. The blank-wheel is continuously rotated by means of driving bevel-wheel 59 on shaft 3, meshing into driven bevel-wheel 60, mounted on the shaft 55, the wheel 60 having peripheral pinion-teeth 61, meshing into a similar wheel 62, mounted on shaft 63 and adapted to revolve in a reverse direction the splint-distributing wheel 64, as shall be more fully hereinafter described.

The splint-carrying or spindle wheel 54 is provided with a series of radially-arranged spindles 65, slidingly and rotatively mounted in bearings 66 upon the wheel, within which and slightly above its level is a stationary slide-wheel 67, rigidly suspended from the arms 58. The inner end of each spindle is provided with a rectangular block 68, the faces $a$ $b$ $c$ $d$ of which are at varying distances from the center of the spindle. Normally the block is carried around the spindle, with the face $a$ bearing upon the slide-wheel 67 until arriving at a position opposite to the table, when the inner end 69 of the spindle comes into contact with the vertical cam-face 70 of the slide-wheel 67, when the spindle will be forced outwardly, forcing a small flat needle 71 in the end of the spindle into the match blank or splint, which will then be carried around with the spindle in its travel with the wheel.

Attached to the outer end of each bearing 66 is a spring-wire 72, having a downwardly-turned point 73, adapted to engage the groove 52 and to clear out cuttings, &c., and leave the space clear of obstructions for entrance of the next blank.

It is designed that the spindle 65 shall transfix the splint upon the needle 71 and deliver it to the splint-distributing wheel 64 in a vertical position. For this purpose it is necessary to give the splint a quarter-turn, for which purpose an outwardly-projecting upper flange 74 of wheel 67 projects into the path of the block 68 and engages the advancing face $b$, thereby giving it a quarter-turn, when the face $b$ will ride against the under side of flange 74. The body portion of the wheel 67 is cut out at 75 for passage of the block 68 in turning, while the gradual projection of the vertical wall of the wheel causes a steady outward travel of the spindle, its back end 69 riding against such wall, which culminates at 70' at the point of greatest extension.

For the purpose of aiding in preventing accidental or excessive turning of the spindle 65 a friction-spring 65' is secured in the holder 66 and bears against the under side of the spindle with considerable pressure at all times. At this point the match-splint is delivered to the splint-distributing wheel from the spindle, which then recedes by reason of an outer edge 76 of wheel 67, against which the outer face of block 68 bears, and at the termination of the cut-out portion 75 is a shoulder 77, which engages face $a$ of the block, causing it to reverse its position, assuming the original position, and riding upon the upper surface of wheel 67, with face $a$ in contact. For the purpose of facilitating the turning of the block the faces are provided with recesses $a'$ $b'$, which engage the abutting shoulders, as described.

When the splint is delivered to the splint-distributing wheel, it is first discharged by the spindle between upper and lower outer annular guard-rails 78, having flaring extremities 79, which are rigidly supported from the stationary framework, and inner spring-wires 80, the lower end of the splint resting on a plate 81, also rigidly supported. Between such guard-rails and spring-wires the splint is momentarily supported until it is engaged by the projecting upper and lower ends 82 of arms 83, pivoted on pins 84 in the wheel 64. Through the outer ends of arms 83 passes a pin 85, projecting at each end, to which at a point midway is attached a retracting-spring 86, attached to part of the revolving wheel. Immediately in advance of the ends 82 of arms 83 is a shoulder 87 of a light spring 88, adapted to be depressed by coming into contact with the splint and to spring outwardly when past it, thereby furnishing a support in front for the splint and maintaining it between such shoulders and ends 82 in an upright position, the lower end resting on plate 81. In this position it is carried around and discharged to the carrying-tapes 89 90, which are of considerable length, traversing through a considerable portion of the machine, and between which the matches are carried until discharged in a finished condition. At the point at which the splints are delivered to the tapes they are brought together around vertical rollers 91, and for the purpose of releasing the splint stationary upper and lower cams 92 are mounted in the path of pins 85, by which the ends 82 are thrown inwardly from engagement with the splints and so held for a short period of the revolution, the retracting-springs 86 throwing them outwardly upon riding off of the cams.

The tapes 89 90 are held closely adjacent to each other, so as to embrace the splints from the point at which they are introduced until they commence to wind upon the storage-cylinder. An outwardly-curved plate 91' forms a backing and guide, supported upon uprights 92' and furnished at the top and bottom with projecting edges 93, between which the larger of the tapes 89 is engaged. The tape 90 is considerably narrower and is held up against the tape 89 by a longitudinal strip 94, conforming to the curve of plate 91', supported on the ends of temper-screws 95, mounted in the ends of spring-arms 96, attached to the plate 91'. This plate is grooved throughout its inner central length at 97, so that when pressure is applied by screws 95 and exerted by strip 94 against the middle of the splints they will be held with considerable friction between the tapes and against the backing-plate, securely retaining the splints and carrying them through in their travel.

Figures 1, 2:
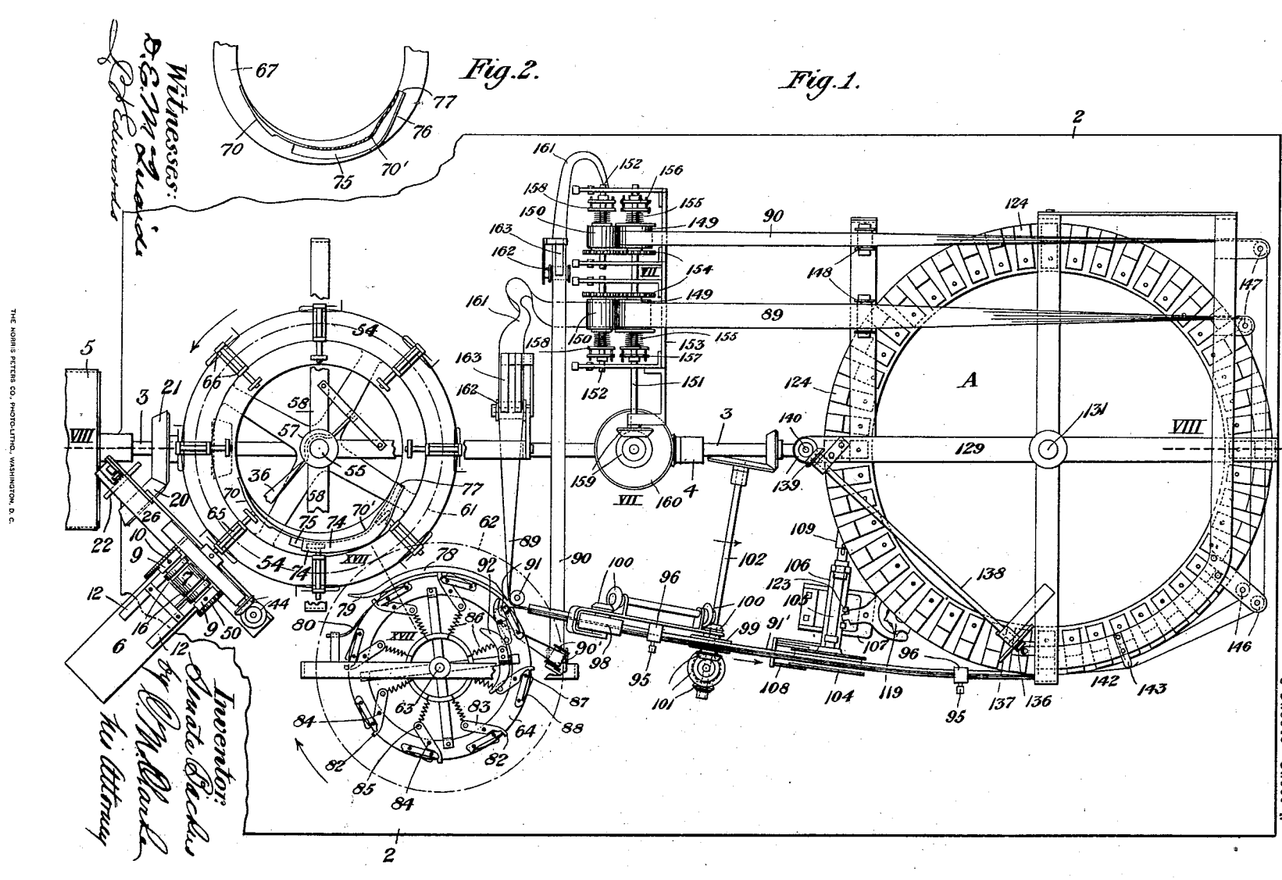
Figure 1 is a general plan view of my machine.
Fig. 2 is a partial detail plan view of the cam-ring of the spindle-wheel.
Figures 3, 4, 5, 6, 7:
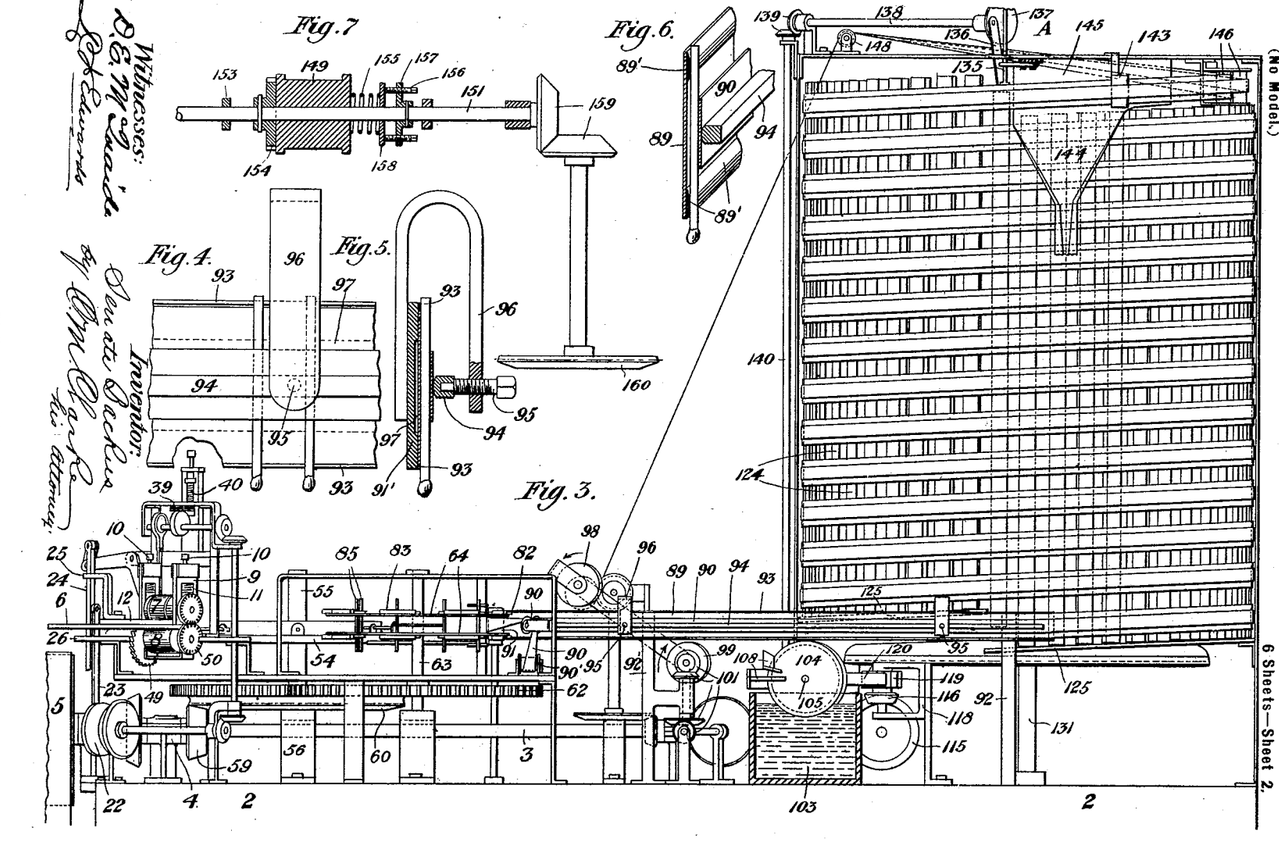
Fig. 3 is a view in side elevation.
Figs. 4 and 5 are detail views, on an enlarged scale, of the carrying-tapes and supports therefor.
Fig. 6 is a similar detail view in perspective, illustrating a modified construction.
Fig. 7 is a cross-section, on an enlarged scale, through one of tension-rollers indicated by the line VII VII of Fig. 1.

In Fig. 6 I have shown a modified construction in which the wide tape 89 is furnished with upper and lower projecting edges 89', of frictional material, as rubber, against which the splint is held by the narrow tape 90 under pressure of strip 94, thus firmly embracing the splint. With this form of tape the concave recess 97 of the backing-plate 91' may be dispensed with. Immediately in advance of the point at which the splints are delivered to the tapes are located upper and lower alining-wheels 98 99, positively driven at the same speed as the tapes in the same direction, as indicated by the arrows, through bevel-gearing 100, actuated through similar gearing 101 and counter-shaft 102, similarly geared to the main shaft 3. By these wheels, which are preferably covered with an elastic substance, as rubber, the splints are adjusted to the same height in the tapes, the lower ends being thereby on exactly the same level.

103 is a reservoir containing the composition for tipping the matches adjacent to the roller 99, within which is revolved a feed-roller 104, mounted on the end of a shaft 105, having its bearings in an oscillating carrier 106, slidingly mounted in a support 107. Scrapers 108, secured to the carrier, serve to remove any excess material carried up by the wheel. The wheel is revolved through shaft 105 having an expansible connection 109 with a bevel-wheel 110, driven through bevel-wheels 111 112 from a counter-shaft 113, to which motion is imparted through gearing 114 from the main shaft 3. At the end of the counter-shaft 113 is a bevel-wheel 115 in mesh with a bevel 116 on the short shaft 117, mounted in bracket 118, and on which is secured a star-wheel 119, engaging the forked ends 120 of an arm 121, pivoted at 122 to frame 107 and engaging by its forward end lugs 123 in carrier 106. When the counter-shaft 113 is set in motion, it will be seen that the composition-wheel 104 will be rotated also at the same speed as the tapes and at the same time oscillated in the direction of its shaft both ways at considerable speed, the object being to distribute the heading composition and thoroughly submerge and cover the ends of the splints.

Figures 8, 9, 10:
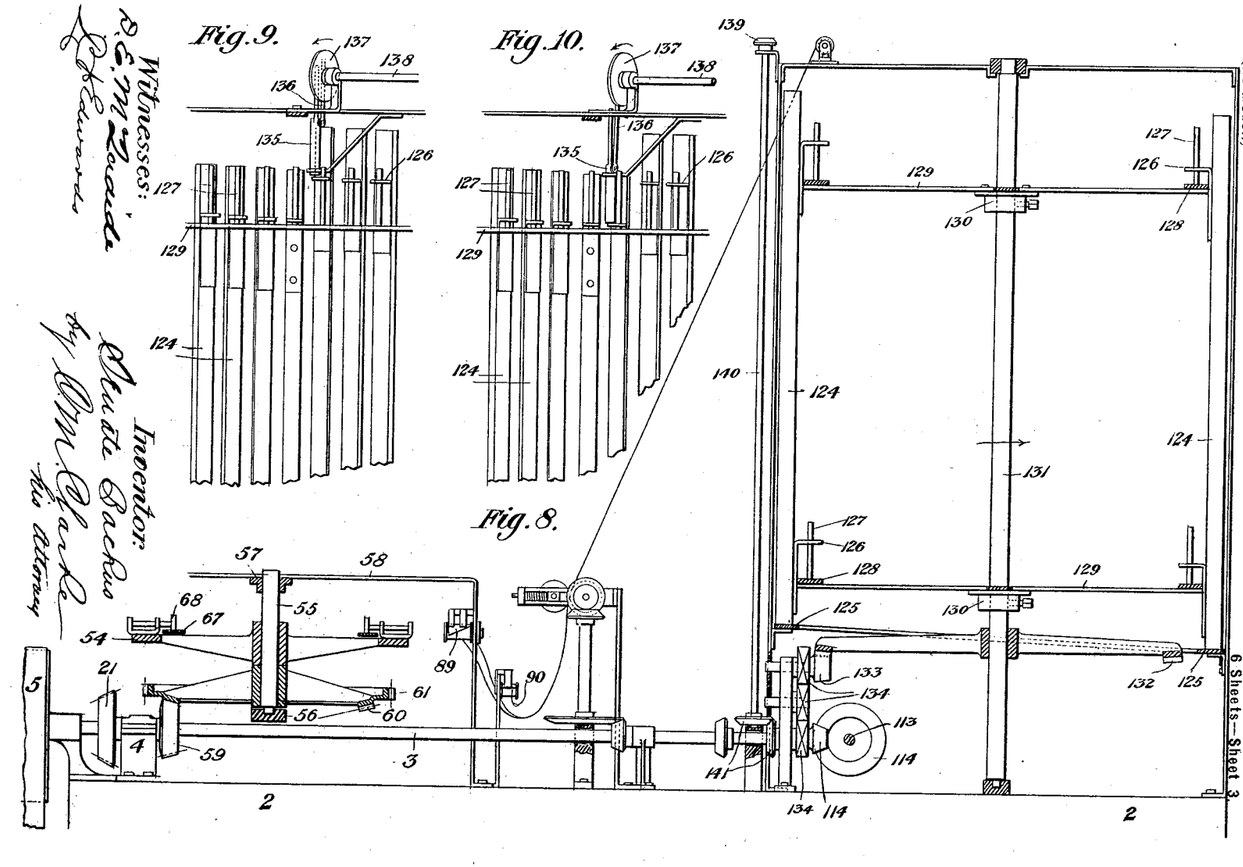
Fig. 8 is a central longitudinal vertical section taken on the line VIII VIII of Fig. 1.
Figs. 9 and 10 are detail views from the interior of the drum, illustrating the mechanism for throwing down the staves.
Figures 11, 12, 13, 14:
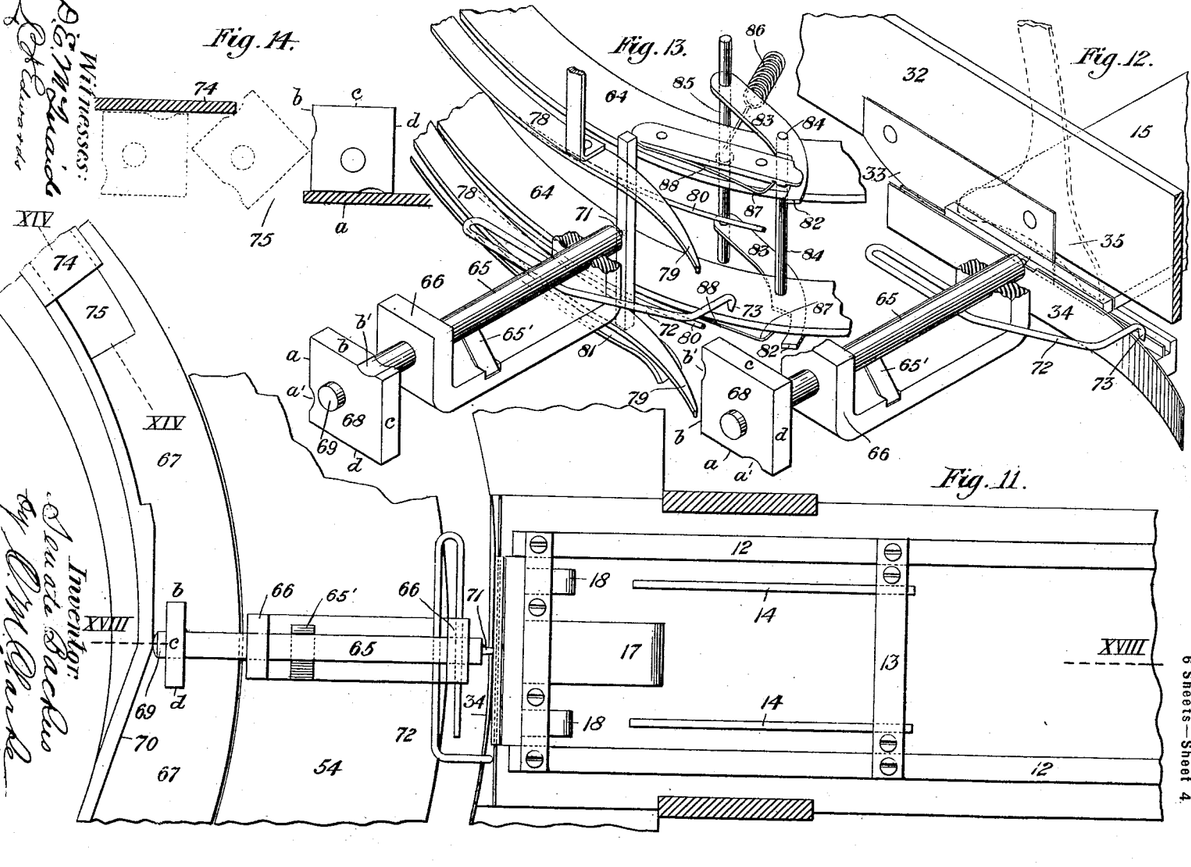
Fig. 11 is a plan view, full size, of the feed-table and parts of the spindle-wheel.
Fig. 12 is a detail view in perspective, illustrating the shears and splint-spindle.
Fig. 13 is a similar view showing the spindle delivering the splint to the temporary holding-fingers.
Fig. 14 is a detail view in section, taken on line XIV XIV of Fig. 11, showing the steps of rotation of the spindle-blocks.
Figures 15, 16, 17:
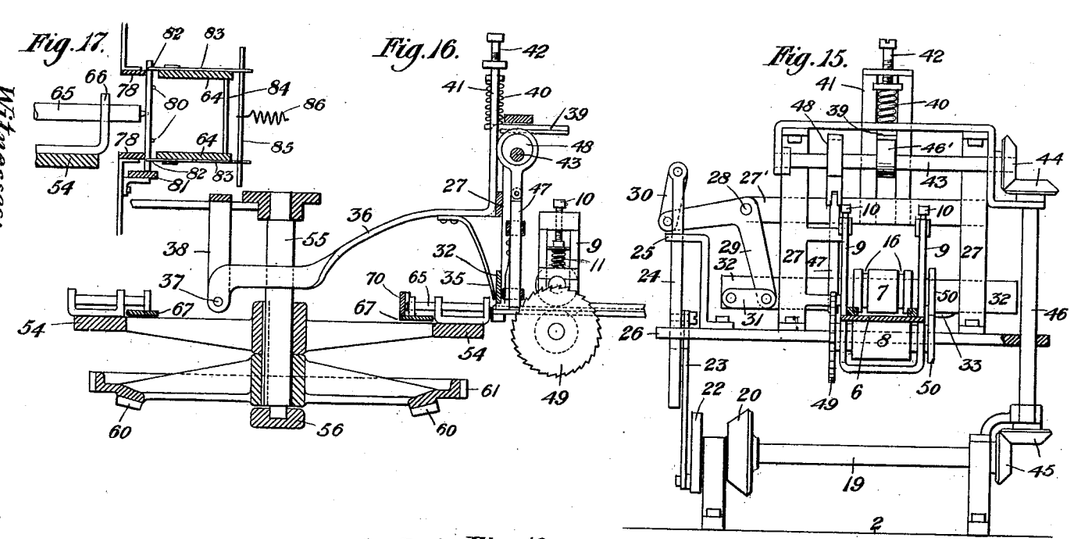
Fig. 15 is a face view of the feed-rollers, reciprocating knife-bar and supporting-framework, and actuating mechanism.
Fig. 16 is a view in side elevation, partly in section, of the feed-roller-actuating mechanism and the splint-wheel.
Fig. 17 is a cross-section, on an enlarged scale, taken on the line XVII XVII of Fig. 1.
Figure 18:
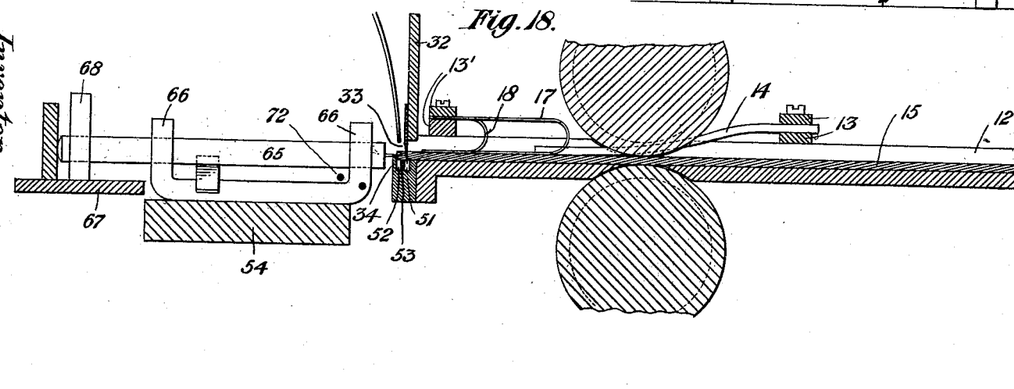
Fig. 18 is a longitudinal section taken through Fig. 11 on the line XVIII XVIII.
Figure 19:
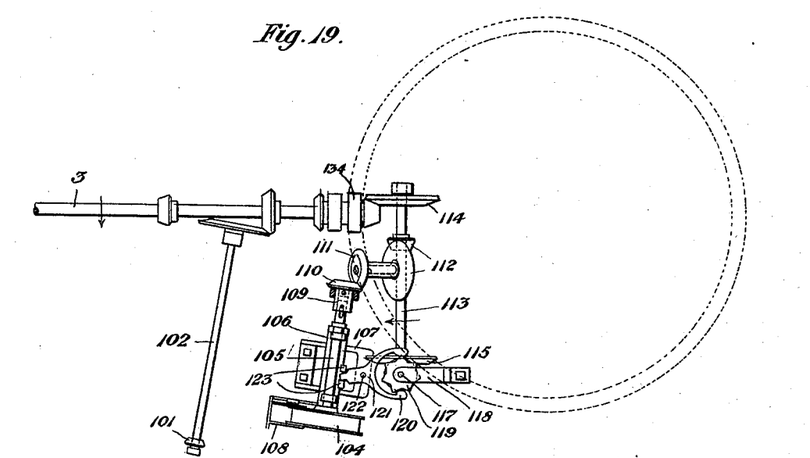
Fig. 19 is a plan view of the gearing for actuating the composition-wheel.

For the purpose of storing the finished matches and giving sufficient time for the heading composition to dry it is designed that the double tapes, with the matches held therein, shall be wound spirally around a cylindrical drum A', located at the end of the machine. This cylinder is composed of a series of vertical staves 124, the lower ends of which rest upon a spirally-disposed circular plate 125, each stave being provided with retaining-clips 126, fitting upon vertical pins 127, mounted in rings 128, secured by arms 129 to hubs 130, mounted on a vertical central shaft 131. Motion is imparted to this shaft and to the staves at a reduced speed through bevel gear-wheels 132 133 and pinion-wheels 134 from the main shaft, as clearly shown in Fig. 8, and it will be seen that as the staves are carried around they will gradually ride upwardly, due to the spiral inclination of the plate 125. When the staves arrive at the end of such plate and are at the highest point, they are individually in succession thrown downwardly upon the lowest end of the plate by means of a reciprocating bar 135, mounted in proper guides, to which bar is pivotally connected the end of a pitman 136, attached to a crank-disk 137. This crank-disk is mounted on the end of a shaft 138, extending angularly across the top of the drum and mounted in suitable bearings secured to the permanent framework. The shaft 138 is operated through bevel-wheels 139, shaft 140, and bevels 141 from the main shaft 3 at such a speed as to produce one revolution of the disk for each progressively-advancing stave. The bar 135 in its downward travel comes into engagement with the clip 126 immediately back of pin 127 and throws the stave down into the lowest position, the bar being then retracted and the operation repeated upon the successive staves as they come into range as long as the machine is operated. The effect of the gradually-rising staves upon which the tapes are wound is to cause the tapes to assume a spiral arrangement by friction upon the staves around the drum, as shown in Fig. 3, the tapes completely traversing the drum for its entire length and at a distance apart from center to center equal to the entire rise of the staves in one revolution. This distance apart is somewhat greater than the length of match, which prevents interference, and at the point of discharge 142 the outer tape 90 is separated from the inner 89 by a distending stop 143, which also acts as a knocker to dislodge any adhering matches. The matches fall from such point into a chute 144, by which they may be conveyed to any desired point for packing.

The upper end of the chute 145 is widened and constitutes a fender to relieve the inner tape from further contact with the staves.

From the point of separation the tapes are individually carried around vertically-mounted rollers 146 147, across to horizontal rollers 148, and down to tension-rollers 149 150, mounted on shafts 151 152 in suitable framework 153. The shafts 151 and 152 are geared together by spur-gears 154, against which the rolls 149 150 are held in frictional contact by springs 155, the pressure of which is controlled by temper-screws 156, mounted in disks 157, secured to the shafts and bearing against washers 158, in engagement with the springs. The shaft 151 is driven through bevel-gearing 159 160 from the main shaft 3 at a somewhat greater speed than the desired speed of the feed-rolls 149 150, the frictional means I have described allowing for necessary slippage, and by this means a tension is continuously exerted upon the tapes. A slight amount of slack 161 in the tapes intervenes between such feed-rollers and rollers 162, mounted in suitable bearings set upon the bed of the machine and provided with spring-fingers 163, between which and the rollers 162 the tapes are drawn taut by the drum around rollers 91, the narrow tape 90 passing around guide-rollers 90', at which point the splints are introduced, as has been already described.

From the foregoing description the operation will be readily understood and the builder will be enabled to construct and operate a machine in conformity with my invention.

Changes and modifications may be made in the proportions, design, or arrangement without departing from my invention, and while conforming to the principles, mechanism, and operation I do not desire to be limited to the exact construction shown and described, but to include within its scope all such reasonable changes and variations as will be suggested to the skilled mechanic.

What I claim, and desire to secure by Letters Patent, is—

1. In a match-machine provided with means for receiving the splints horizontally and carrying them vertically: a composition-wheel adapted to distribute the composition to the splints, a reservoir, and means for rotating and oscillating the wheel, substantially as set forth.

2. A match-machine provided with means for intermittently feeding a strip of veneer, means for dividing the veneer into splints, impaling-needles for conveying the splints vertically and separately, means for applying a heading composition, and means for storing and drying the finished matches, in vertical position, heads downward, substantially as set forth.

3. In a match-machine the combination of a feed-table provided with guiding edges, and a limiting-stop, plane lower and grooved upper feed-rollers mounted thereon, pressure-springs mounted on the table extending through the grooves of the upper roller and adapted to bear on the blank in advance of the rollers, and a reciprocating shear-knife adapted to sever splints from the blank, a splint-holding treadle and a device for removing the splints singly, substantially as set forth.

4. In a match-machine provided with a feed-table, feed-rollers mounted thereon, a limiting-stop for the blank and an under support for the splint with clearance-spaces at each side: a reciprocating shear-knife adapted to sever splints from the blank, a splint-holding treadle, means for removing the splint, and means for removing cuttings, substantially as set forth.

5. In a match-machine, the combination of a feed-table, feed-rollers mounted thereon, a limiting-stop, a shearing-knife, and needle mechanism for removing the splints singly, substantially as set forth.

6. In a match-machine provided with a knife adapted to shear splints from a strip of veneer, a pointed spindle adapted to engage and remove the severed splint, substantially as set forth.

7. In a match-machine provided with a knife adapted to shear splints from a strip of veneer, a reciprocating spindle provided with a needle-point adapted to be inserted in a splint, substantially as set forth.

8. In a match-machine provided with a knife adapted to shear splints from a strip of veneer, a spindle provided with a needle-point, means for advancing the spindle to insert the needle in a splint, and means for moving the spindle, substantially as set forth.

9. In a match-machine provided with a knife adapted to shear splints from a strip of veneer, a spindle provided with a needle-point, means for advancing the spindle to insert the needle in a splint, means for moving the spindle and for giving it a partial rotation, substantially as set forth.

10. In a match-machine provided with a feed-table, feeding-rolls, and a shearing-knife for cutting the splints, a spindle-wheel adapted to rotate in proximity to the inner end of the feed-table, a series of pointed spindles mounted thereon, and means for forcing the spindles outwardly, to engage the splints, partially rotating and reversing the spindles, and then retracting them, substantially as set forth.

11. In a match-machine provided with a feed-table, feeding-rolls, and a shearing-knife for cutting the splints, a stationary slide-wheel, a spindle-wheel concentric therewith provided with a series of pointed spindles mounted thereon having blocks adapted to bear upon the slide-wheel, and cam-faces and abutments on the slide-wheel adapted to advance, partially rotate and retract the spindles, substantially as set forth.

12. In a match-machine provided with a spindle-wheel provided with pointed spindles, and temporary holding devices for the splints: a splint-distributing wheel provided with arms adapted to engage the splints and deliver them to conveying-tapes, substantially as set forth.

13. In a match-machine provided with means for delivering the splints in a vertical position to temporary holding devices: a splint-distributing wheel provided with arms adapted to engage the splints and retaining-springs in advance of the arms, substantially as set forth.

14. In a match-machine provided with a rotatable spindle having a needle-point for delivering the splints in a vertical position to temporary holding rails and wires: a splint-distributing wheel provided with pivoted arms adapted to engage the splints and deliver them to conveying-tapes, and means for disengaging the arms, substantially as set forth.

15. In a match-machine provided with means for delivering the splints in a vertical position to temporary holding devices, with annular retaining-bars: a splint-distributing wheel provided with pivoted arms adapted to engage the splints, retaining-springs in advance thereof, retracting-springs, and a stationary cam for disengaging the arms, substantially as set forth.

16. In a match-machine, splint-conveying mechanism consisting of a wide and narrow tape, an outwardly-curved plate having top and bottom edges forming a guide for the wide tape and a pressure-strip adapted to bear upon the narrow tape, with means for exerting elastic pressure on the strip, substantially as set forth.

17. In a match-machine, splint-conveying mechanism consisting of a wide and narrow tape, a guide for the wide tape having a recess at its middle portion, and a pressure-strip adapted to bear upon the narrow tape, with means for exerting elastic pressure on the strip, substantially as set forth.

18. In a match-machine, splint-conveying mechanism consisting of a wide tape having projecting ribs at top and bottom, a narrow tape midway of such wide tape, and a pressure-strip adapted to bear upon the narrow tape, with means for exerting elastic pressure on the strip, substantially as set forth.

19. In a match-machine, in combination with vertical splint-conveying mechanism consisting of a wide and narrow tape, a plate having top and bottom edges forming guides and an elastically-actuated pressure-strip adapted to bear upon the tapes: upper and lower adjusting-rollers adapted to bear upon the tops and bottoms of the splints, positively driven in the same direction as the tapes, substantially as set forth.

20. In a match-machine, a composition-wheel and a reservoir, with means for rotating the wheel and imparting to it a transverse oscillatory motion, substantially as set forth.

21. In a match-machine, a grooved composition-wheel mounted on a spindle having a bearing in a sliding frame, a sliding connection with rotating gearing, and a reciprocating arm in engagement with the sliding frame and means for actuating the arm, substantially as set forth.

22. In a match-machine provided with double conveying-tapes: a storage-drum consisting of vertical staves supported on a circular inclined plate, and means for rotating the drum, substantially as set forth.

23. In a match-machine provided with double conveying-tapes: a storage-drum consisting of vertical staves mounted on a circular inclined plate forming a spiral, means for rotating the drum, and means for lowering each stave from the highest extremity of the circular inclined plate, substantially as set forth.

24. In a match-machine provided with double conveying-tapes: a revolving storage-drum consisting of staves upon which the tapes are wound, means for gradually advancing the staves throughout their revolution whereby the tapes assume a spiral direction, and means for retracting each stave at the same point, substantially as set forth.

25. In a match-machine provided with double conveying-tapes: a revolving storage-drum consisting of staves upon which the tapes are wound, means for gradually raising the staves throughout their revolution whereby the tapes assume a spiral direction, means for lowering each stave at the same point, a separating device for the tapes and a conveying-chute, substantially as set forth.

26. In a match-machine provided with double conveying-tapes and a revolving storage-drum upon which the tapes are wound spirally: guide-rollers mounted in the framework and tension-rollers with friction driving mechanism, substantially as set forth.

27. In a match-machine, double conveying-tapes disposed around guiding-rollers and meeting at a splint-receiving point, carried through vertical guiding mechanism disposed in a curve, carried spirally around a storage-drum, separated and carried around guide-rollers to tension-rollers provided with positively-driven friction driving mechanism, and over guide-rollers provided with tension devices to the meeting-point, substantially as set forth.

28. In a match-machine, a tape provided with projections of frictional material at each edge, a narrower tape traveling in the same plane between such projections, and means for holding the tapes together, substantially as set forth.

29. In a match-machine, a tape provided with projections of frictional material at each edge, a narrower tape traveling in the same plane between such projections and means for holding the tapes together and for transmitting to them forward motion, substantially as set forth.

30. A match-machine comprising a feed-table, feed-rollers mounted thereon, a splint-cutting knife, a spindle-wheel provided with means for transfixing and carrying the splints, a splint-distributing wheel adapted to deliver the splints to conveying-tapes, conveying-tapes for carrying the splints, alining-rollers, a composition-roller, and a winding-drum, substantially as set forth.

31. A match-machine comprising a feed-table, feed-rollers mounted thereon with pressure-adjusting devices, a reciprocating splint-cutting knife, a spindle-wheel provided with pointed spindles for transfixing, carrying the splints and partially rotating them, temporary holding devices, a splint-distributing wheel adapted to deliver the splints to conveying-tapes, conveying-tapes mounted edgewise in supporting-framework, upper and lower alining-rollers, a composition-roller submerged in a reservoir with means for rotating and oscillating the roller, a winding-drum composed of staves mounted on supporting mechanism adapted to cause the conveying-tapes to assume a spiral arrangement, and means for discharging the matches, substantially as set forth.

In testimony whereof I have hereunto set my hand.

SENATE BACKUS.

Witnesses:
PETER J. EDWARDS,
C. M. CLARKE.